Figures 1A, 1B:
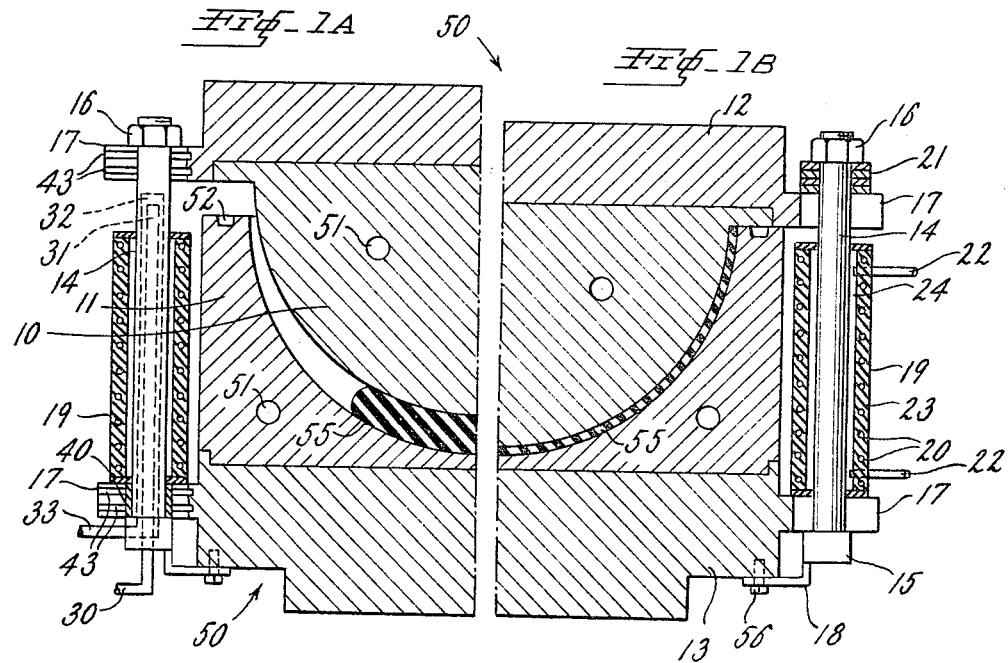

INVENTORS
HERBERT F. JURGELEIT
MAX M. AUSTIN

ATTORNEY

United States Patent Office 3,287,486
Patented Nov. 22, 1966

3,287,486
MOLDING APPARATUS AND METHOD EMPLOYING THERMAL EXPANSION AND CONTRACTION
Herbert F. Jurgeleit, Oceanside, N.Y., and Max M. Austin, Granger, Ind., assignors to United States Rubber Company, New York, N.Y., a corporation of New Jersey
Filed Apr. 15, 1963, Ser. No. 272,969
27 Claims. (Cl. 264—325)

The present invention relates to a pressing and clamping apparatus and process utilizing the stresses and loads that can be produced by thermal expansion and contraction.

In the molding of rubber, rubber-like, and plastic compounds, either one or a combination of two general methods are employed: the injection method or the older, more conventional compression method. The molds, whether of the compression type or of the injection type, are ordinarily operated in hydraulic type molding presses or in molding machines incorporating the essential features of conventional molding presses.

While hydraulic molding presses have been found from experience to be the most practical and rapid means of operating molds for products of usual sizes and types (for example, for molded products up to about 25 inches in diameter), the press tonnages (press loads) required becomes enormous in the case of such large size molded products as are now in demand (for example, 54 inches and larger in diameter) for compression molding of large products for missiles including rocket motor case insulations. When contemplating press tonnages in the millions of pounds, it is necessary to consider not only the high cost of these presses, but also the enormous volume of highly valuable factory space required for them.

Furthermore, because of the many variables affecting both the calculation and the achievement of desirable press pressures and because of the difficulty involved in increasing maximum press tonnages in conventional molding presses, there is considerable uncertainty and risk in the specification of the maximum press tonnage requirements for new conventional molding presses about to be purchased, particularly when the contemplated use of the new press involves the making of new products of unusual size or those molded from unfamiliar compounds.

The present invention contemplates and has as its primary object the provision of a pressing and clamping apparatus and process utilizing the stresses and loads that can be produced by thermal expansion and contraction. Another object of this invention is to provide a relatively inexpensive and small pressing and clamping means suitable for any of a wide variety of purposes, such as molding parts of rubber, rubber-like and plastic materials; curing various materials requiring high pressure; and any of the other processes such as matting, embossing, punching, etc.

Yet another object is to provide a substitute for conventional high tonnage presses which is not only of relatively low cost, but of comparatively smaller dimensions.

Still another principal object of this invention is to provide a compression or injection molding device in which any desired tonnage can be applied up to the limit of its capacity; i.e., in which the range of the clamping pressures and loads are readily variable rather than fixed. It is a further object of this invention to provide such a device in which excess capacity (above the contemplated maximum press tonnage) can be provided at relatively little extra cost if any. Another object of this invention is to provide such a device in which the maintenance cost, repair down-time, etc., are almost negligible compared with those of conventional hydraulic presses.

Briefly the pressing process of the instant invention comprises the steps of (1) heating in unison a first plurality of thermally responsive strain devices connecting a pair of pressing elements to elongate said devices, (2) taking up the gaps formed between one of said pair of pressing elements and head portions of the devices of said first plurality in step (1), (3) cooling in unison the devices of said first plurality to reduce the elongation and press said pair of pressing elements towards each other, (4) heating in unison a second plurality of thermally responsive strain devices connecting said pair of pressing elements to elongate said devices, (5) taking up the gaps formed between one of said pair of pressing elements and head portions of the devices of said second plurality in steps (3) and (4), and (6) cooling in unison the devices of said second plurality to reduce the elongation and further press said pair of pressing elements towards each other.

Briefly the pressing apparatus of the instant invention comprises at least two pressing elements adapted to exert closing pressure on an object therebetween, a plurality of sets of elongated thermally responsive strain devices, means for each set for heating the devices thereof in unison, means adapted to control said heating means to heat the devices of successive sets after the devices of preceding sets have commenced cooling, and means to take up the gaps caused between head portions of the devices of a particular set and one of said pressing elements by the thermal axial elongation of the devices of that particular set and the thermal axial contraction of the devices of the other sets; whereby there is a continuous exertion of clamping pressure by cool devices which prevents retreat of said pressing elements from one another during heating of other devices.

Figures 2, 3A, 3B:
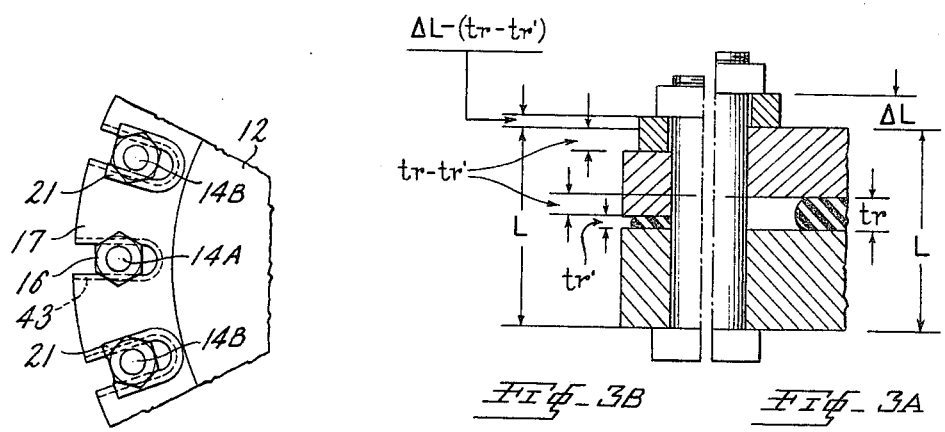

Further objects and advantages of the present invention can best be understood by a perusal of the following detailed description in conjunction with the drawings in which:

FIG. 1A is a sectional front view of one press and mold combination embodiment of the present invention, showing the mold only partially closed; and FIG. 1B is a sectional front view of one press and mold combination embodiment of the present invention, showing the mold fully closed;

FIG. 2 is a partial top view of a press embodiment after spacers have been inserted on only one set of rods; and FIG. 3A is a schematic representation of a mold and strain rod after heating of the strain rod and insertion of a spacer, showing the relationship of the parts before cooling; and FIG. 3B is a schematic representation of a mold and strain rod after heating of the strain rod and insertion of a spacer, showing the relationship of the parts after cooling.

A preferred embodiment of this invention is the mold closing and clamping device (press) 50 for large compression type molds depicted in FIG. 1. FIG. 1A represents one press and mold embodiment in a partially closed position (before any thermal cycling); FIG. 1B, another embodiment in a fully closed position. Purely as a frame of reference, it is noted that a mold cavity may be substantially hemispherical in shape, the mold having a diameter of, say, 72 inches and an overall height of from, say, 39 to 58 inches when closed. The mold 11 is divided into an upper section 10 and a lower section 11 and has a circumferential overflow-receiving groove 52 outside the molding area of the lower section. Internal heating means, such as a steam pipe 51, for plasticizing and curing the molding compound 55 are incorporated in each section of the mold.

In this device, the two mold sections 10, 11 are sandwiched and clamped between two pressing elements: upper clamping member 12 and a base or lower clamping member 13. The two clamping members 12, 13 are clamped against the mold sections 10, 11 by a plurality of elongated strain rods 14, which are located outside of the circumference of the molding area and connectively engage the slotted peripheral extensions 17, called lugs, of the clamping members 12, 13. There are, in this embodiment, 30 strain rods 14, each strain rod being approximately 100 inches long and approximately 3½ inches in diameter along the body portion.

At the lower end of each strain rod 14 and integral therewith are retaining means connecting the same to the lower clamping member 13. The retaining means here comprise a retaining plate 18, which supports and firmly holds up the enlarged base portion 15 at the lower end of the strain rod 14. The retaining plate 18 is connected to the lower clamping member 13 by a bolt 56 and pushes the base portion 15 against the lower surface of the lower lugs 17, thereby preventing drop-out of the strain rod 14 from the press 50, but allows lateral displacement of the strain rods 14 from the press 50, thereby enabling disassembly of the mold sections for removal of the molded product, cleaning of the mold, and cooling of the strain rods. The head portion or upper end of each strain rod is threaded and provided with a nut 16, which can be locked in place to prevent turning, after its initial downward adjustment, by any one of several nut-locking means well-known in the art, such as use of a lock-nut, an Acme thread, doweling, etc.

Each strain rod 14 is provided with controlled thermal means for alternately heating and cooling the long body portions of the strain rods. In the embodiment described in FIG. 1, particularly, FIG. 1B a tubular pipe element 19 surrounds each strain rod 14 and contacts the strain rod at the top and bottom of the body portion thereof. Between each tubular pipe 19 and its associated strain rod 14 is an annular passage 24 into which steam, hot water, or cold water may be introduced—through inlet and outlet pipe connections 22—to cause the heating or cooling phase of the thermal cycling, as desired. Natural convection or forced gas and liquid drafts may be used. The invention, of course, is not limited to this heating and cooling means; for example—as will be described later—the rods themselves, in some applications, may be provided with internal passages for the circulation of gases and liquids to expedite the heating and cooling processes, whether instead of or in addition to the external heating and cooling means stated above. Similarly, electrical heating may be utilized, either internally or externally and the electrical heating may be of either the resistance or induction type.

Uniform load distribtuion and parallel closure of the mold sections is afforded by operating the symmetrically-located alternate rods 14 comprising a set in unison, all rods in each set being heated and cooled in unison. In the particular design illustrated in FIG. 1, the device contains 30 symmetrically spaced strain rods. For thermal cycling purposes, the strain rods are operated in and as symmetrically located sets—in this case, two sets of 15 alternate rods each. In other words, if these 30 strain rods were numbered in consecutive order from No. 1 to No. 30, all odd numbered rods 14A would be heated and cooled (i.e., "operated") in unison as a set, and all even numbered rods 14B would be operated in unison as another set.

While the first set of rods 14A maintains the moderate clamping pressure produced by the initial "turn-down" or torquing of the nuts, the second set of rods 14B is heated. When fully heated, gap-filling means called spacers 21— such as flat spacers split washers, or, in this embodiment, U-shaped washers—are inserted under the nuts 16 (between the nuts 16 and the upper lugs 17) of these rods 14B to take up or fill the gap produced by the thermal expansion of these rods, after which these rods 14B are cooled. The thermal contraction of these rods 14B upon cooling partially closes the mold and produces gaps or spaces under the nuts 16 of the first set of rods 14A.

The heating of the first set of rods 14A begins towards the end of the cooling cycle of the second set of rods 14B. The heating and expansion of the first set of rods 14A increases the gaps already present under the nuts of these rods 14A to approximately double their size, because of the above-described partial closure of the mold (previously produced by the second set of rods 14B) and the expansion of the first set of rods 14A. Spacers 21 are then inserted under the nuts 16 of this first set of rods 14A to take up the gap, after which these rods 14A in turn are cooled.

Toward the end of the cooling cycle of the first set of rods, the heating of the second set of rods 14B begins again, and, when fully heated, additional spacers are inserted under the nuts of these rods 14B. This process is repeated until the mold is fully closed or seated.

The last set of strain rods to be shrunk (i.e., cooled) just prior to complete closure of the mold maintains the clamping pressure on the mold required during the vulcanization or curing of the compound. At the end of the prescribed curing period, the rods of this set are heated by an amount just sufficient to permit their removal from the clamping device.

After curing is completed, all strain rods 14 are removed manually by lateral displacement thereof from the press lugs 17, the upper clamping member and mold section are removed, the molded part is taken from the cavity and the mold is cleaned, lubricated and charged again with raw compound as before; i.e., the molding cycle is repeated.

The dimensions and number of strain rods 14 selected for the above described compression molding embodiment and the operation of these rods in two sets were established from various factors—i.e., mold closing, curing cycle, etc. In certain other applications it may be advantageous to operate the rods in more than two sets (e.g., 3 sets of 10 rods each) depending on the design of the part to be formed, the plasticity of the compound or material to be molded, the curing or molding cycle, the dimensions and number of the rods, etc.

In injection molding, this device may serve as a means of tightly clamping the closed cavity type molds usually employed; i.e., to resist the mold opening force exerted by the compound in the mold cavities. By mold opening force is meant the force resulting from the hydrostatic or fluid pressure that is transmitted by means of the compound from the material injection cylinder through the injection nozzle, runners, and sprues to the walls of the mold cavities. Maximum pressure of the compound against the walls of the mold cavities occurs as soon as the cavities become filled; i.e., upon the completion of compound injection. Since hydrostatic or fluid pressure exerts itself in all directions, the mold opening force will be equal to the average hydrostatic pressure in pounds per square inch multiplied by the area of the cavities in square inches as projected upon the parting line or parting plane of the mold.

Rubber and rubber-like compounds, thermosetting plastics and thermoplastic compounds become sufficiently like fluid, when in the heated and plasticized state, to transmit such pressures. The amount of cavity pressure and the resultant amount of mold opening force depends largely upon the injection pressure; i.e., the pressure applied to the compound in the material injection cylinder. The injection pressure, in turn, depends upon the flow characteristics of the compound (i.e., the apparent viscosity), the dimensions of the passages through which the compound must flow (i.e., injection nozzle, runners, sprues, and—in some cases—the cavity itself), curing cycle, etc. Injection pressures in present day use range say, from, 200 to 100,000 lbs. per square inch.

Because of the many variables affecting molding pressure (especially injection pressure and, resultantly, mold opening force), there is considerably difficulty in precisely specifying the maximum press tonnage requirements (i.e., the precise tonnage required to overcome mold opening forces) for new conventional molding presses about to be purchased, particularly when the presses will be used to make new products of unusual size molded from unfamiliar compounds. Increasing the maximum capacity of a conventional press is a difficult and often expensive operations. One of the principal advantages of the instant invention as applied to compression and injection molding is that it avoids or greatly reduces the need for such operation. With embodiments of the instant invention, any desired tonnage can be applied up to the limit of the planned press capacity, and excess capacity can ordinarily be provided at relatively little extra cost, as by increasing the temperature differentials used, the number of thermal cycles used or even increasing the number of rods. Moreover, the maintenance cost, repair down-time, etc. of the instant device is almost negligible compared with those of hydraulic presses.

In an injection mold clamping device embodying the concept of the instant invention the side injection method would ordinarily be employed, using portable horizontal injection units of the type described in U.S. Patent No. 2,533,468.

The invention as applied to injection molding may be used also in the form of a mold clamping device to be operated in conjunction with a conventional type press to supplement the mold clamping tonnage of the press, as will be later described. The molding compound in such a set-up might be injected conventionally either by the central or by the side injection method. Using the central injection method, the centrally located material injection cylinder may be incorporated either in the upper part of the mold (or the upper clamping member) or in the lower part of the mold (or in the lower clamping member), depending on the design and nature of the molded product, the design of the mold, etc. The injection piston of the material injection cylinder ordinarily would be driven, i.e., injection pressure applied, by a hydraulic ram and cylinder (or mechanical or screw type injection means) preferably mounted on the upper or lower clamping member. Using the side injection method, the injection of molding compound into the mold cavity would be performed by one or more of the aforementioned portable horizontal injection units attached to the side of the mold.

Other time and labor saving features might be provided with advantage in certain cases. For example, the strain rods 14 could be attached at their lower ends to the lower clamping member 13 by hinge or ball seat means (not shown) rather than by retaining plates 18 and nuts 56. This would permit the upper ends of the rods to be swung outwards from the peripherally slotted lugs 17 a small amount when assembling and disassembling the upper clamping member and mold section from the device, thus avoiding the time and labor required to remove and replace the rods when using the retaining means 18. This "swinging" attachment of the lower ends of the rods to the lower clamping member would also facilitate the internal heating and cooling of the rods, since flexible connections to the internal heating and cooling means (liquid, gaseous or electrical) could then be provided more easily.

Furthermore, in lieu of the slotted peripheral extensions 17, called lugs, of the clamping members 12, 13 shown in FIG. 1, it may in some cases be more expedient to provide plain holes in the flanges of the clamping members 12, 13 to receive the strain rods 14. Using this construction, the strain rods would always remain in place on the fixture; in opening the mold, the nuts 16 would be removed from the rods before hoisting the upper clamping member and/or upper mold section for removal of the molded part.

In certain cases, the closing of such a device would be made more rapid by providing a mechanical restraining means for taking up the gaps under the strain rod ends instead of inserting spacers under the individual nuts manually. Generally speaking, the various conventional restraining means—i.e., means of taking up the expansion (filling gaps) formed between the nuts and the heads of strain rods after heating, to afford pressing movement and clamping pressure upon subsequent cooling of the rods— may be used, including the following:

(a) U shaped, split ring or other type spacers or washers inserted (after heating) either manually or mechanically;

(b) Unidirectional nuts uniformly "torqued" or tightened down on the threaded strain rods (after heating), either manually or mechanically, as by gearing; and (c) Continuous strips or cams having graduated steps, flanges, or thickness increments which, automatically or through manual intervention, restrain motion of the engaged portion of the strain rod in one direction relative to the upper clamping member (as upon rod cooling), while allowing relative motion in the other direction (as upon rod heating).

In yet another embodiment of this invention, the mold 10, 11 is provided with lugs 17 and strain rods 14, so that the mold may be operated without an external press. In this embodiment the upper mold section 10 and upper press clamping member 12 constitute a unitary integral mold section as do the lower mold section 11 and lower press clamping member 13.

Another form of the invention as applied to the closing and clamping of molds would be a mold closing and clamping device for use inside of, and as a supplement to, a conventional type press. The design of the mold closing and clamping device of FIG. 1 is suitable as shown for use in conjunction with either a conventional type hydraulic molding press or a press of the instant design. If, for example, an available press did not have sufficient tonnage for the closing and/or clamping of a given compression mold for a given application, the mold may be operated in a device similar to that shown in FIG. 1, and the whole assembly—press and mold—installed in another press of either the instant design or a conventional type. The mold closing and clamping tonnage afforded by the thermal contraction of the strain rods of the device would be additive to the press tonnage of the other press. When thus used in a conventional type hydraulic press, for example, the hydraulic press load would be applied first; i.e., before tightening the nuts 16 wrench-tight. After the hydraulic press has afforded the maximum possible amount of mold closure (i.e., the maximum amount within its capacity), the nuts are tightened wrench-tight and the heating and cooling of the strain rods is performed, in the previously described manner, to complete the closure and clamping of the mold. Meanwhile the full load of the hydraulic press is maintained.

On the other hand, there will undoubtedly be applications wherein a conventional type hydraulic press may be used in conjunction with this thermal device not for added tonnage, but rather in order to take advantage of the longer working stroke ordinarily available in a hydraulic press. For example, the amount of approaching movement required to close a certain mold may be unusually large. A large part of this closing motion will ordinarily require relatively small press tonnage, but the time required for the successive heating and cooling of the strain rods to close the mold by the thermal device alone would be excessive. In such a case, it may be expedient to perform the initial closing of the mold by placing the thermal device in a conventional type press, allowing the hydraulic press to close the mold to the maximum possible extent, then tightening the nuts of the strain rods wrench-tight, and completing the closure and clamping of the mold by thermal means in the manner previously described. In such an application, the load exerted by the hydraulic press may be removed after tightening the nuts, or the subject thermal pressing and clamping device including mold could even be removed from the press entirely for the completion of the mold closing and clamping process.

In another form of the instant invention, the bottom end of each rod is threaded and provided with a nut similar to nut 16, so that the gaps caused by thermal expansion may be uniformly taken up from either or both ends rather than just from the top.

Thermal expansion and contraction is a well known phenomenon, used in the past to free power presses which had become "stuck" or stalled on dead center (U.S. Patents Nos. 2,910,933 and 1,960,166), to afford prestressing of strain rods (U.S. Patents Nos. 2,910,933 and 1,149,518) and to effect the final tightening of two individual sections clamped together to form a turbine casing by allowing a plurality of torqued-down heated nuts to cool (U.S. Patent No. 1,839,850). However, as none of the earlier uses involved the successive operation of sets of thermally cycled strain rods to cause an approaching movement of two press or mold halves, further details concerning the effect of this essential feature of the present invention are provided below.

The maximum mold closing or approaching movement that it is practical to obtain from one heating and cooling cycle of one set of rods is on the order of a fraction of an inch, for the usual application. For the complete closing of compression molds (and, also, injection molds) this amount of movement would ordinarily not be sufficient. If this set of rods were again heated, it would mean that the entire clamping load would be removed from the mold until the next cooling cycle, which would not be permissible in some molding applications. (Many rubber and rubber-like compounds have memory or elasticity which causes reverse flow when the pressure is removed; this would tend to separate the mold members and make it difficult to insert spacers or retaining members 21 under the nuts.) On the other hand, when multiple strain rod sets are being used, one set will be in a cooling (pressure-applied) phase of a thermal cycle while another is in the heating (pressure-released) phase.

Moreover, during the closing of compression mold members, a large part of the linear contraction of the strain rods, when cooled, will go to overcome the flow of the compound—i.e., instead of being entirely converted into stress and load, as will be explained later. Consequently, if only one set of rods is employed, the heating and cooling cycle performed on the rods may result in very little clamping force on the mold after final closure is achieved. On the other hand, when multiple sets of rods are being used, such a residual clamping force after closure may be increased through continued thermal cycling after closure.

The same principle may be similarly used advantageously in injection molding. There are several reasons why a series of approaching movements without complete relaxation of load—i.e., the operation of the rods in two or more sets—will be as necessary in the case of injection molding as it is in compression molding. For example:

In the case of injection molds of the extremely large size now under consideration, the "take-up" of the bending and compressive deflection of the clamping members together with the elastic elongation of the strain rods when under full stress may necessitate more relative movement than one single heating and cooling cycle on a single set of rods can provide.

Injection molded products in many cases contain metal or plastic inserts, which in many instances must be "spring loaded"; i.e., the inserts are held in place in the mold cavity by compression type springs, Belleville spring washers, etc., to prevent displacement of the inserts during the injection of molding compound into the cavity. The compression of these spring members requires considerable approaching or mold closing motion under load prior to the final metal-to-metal contact of the injection mold cavity land surfaces and prior to the final clamping of the mold.

The inserts in injection molded products may require "coining," also called "hobbing." Prior to the injection molding operation, the inserts are ordinarily stamped and/or formed from sheet material or other materials to commercial tolerances. In applications where "spring loading" is inapplicable—as where the insert has longitudinally extending hollows which should not become filled with molding compound during the molding operation—the insert must be held in place by solid, immovable mold cavity members, and some amount of extra thickness or "coining" must be provided on the top surface of the insert to insure intimate contact between the insert and the top mold member to thereby prevent the introduction of molding compound into the longitudinal hollows of the insert. The extra thickness of the "coining" on top of the insert and the possibility of any irregularities of the top surface of the "coining" from the shape of the mold require relative approaching motion of the injection mold members under load to cause reduction of the extra thickness and conformity of the top surface of the "coining" to the top mold form (as by squashing of the "coining" and any irregularities of the top surface thereof by the impinging approaching mold surfaces) prior to final mold closing and clamping.

In certain injection molds, the mold is parted in a vertical plane as well as in the usual horizontal direction, thus requiring the application of both lateral and vertical clamping loads to resist the forces exerted by the compound during injection, which tend to open the mold. This is sometimes accomplished by the use of vertical wedges in combination with springs, such as Belleville springs or hydraulic cylinders. A specialized application of this principle is described and illustrated in U.S. Patent No. 2,526,877 (granted on October 24, 1950). In such applications, considerable approaching movement of the mold clamping members under load is required prior to final mold closure.

In certain injection molding applications, especially those involving large sized products and hard flowing molding compounds, it is expedient to preload the mold cavity at some critical location, prior to injection, with calendered or milled molding compound. In such a case the molding process is a combination of compression and injection molding, and the need for considerable approaching or mold closing movement is similar to that previously explained in connection with compression molding.

The use of pre-stressed strain rods in injection molding is essential if there is to be a properly aligned meeting of the mold halves without the use of strain or guiding rods which are unreasonably large in diameter or number for strength. It is extremely difficult, if not impossible, to achieve sufficient pre-stressing in the tension rods by mechanical or manual tightening or torquing-down of the nuts. Therefore, part of the available axial contraction of the strain rods upon cooling must be used prior to the injection of molding compound to prestress the tension rods.

To summarize—for both injection type and compression type molding—when only a single set of strain rods is being used, the maximum press tonnage may be insufficient or unavailable when most necessary and—or the maximum approaching movement may be inadequate or unavailable without interruption of the clamping pressure. On the other hand, when a plurality of rod sets are being used, the tonnage may be increased and/or maximized for any given instant and the approaching movement may be increased and/or provided without interruption of clamping pressure. These desirable features afforded by successive operation of a plurality of sets result from the possibility of prolonged or extended thermal cycling wherein the press tonnage afforded by a cooling set of rods is at a maximum while the press tonnage afforded by a heating set of rods is at a minimum—depending upon the timing selected for the successive thermal cycling of the sets.

Since economy of time is of the essence in production molding operations, the means proposed for shortening the strain rod heating and cooling cycles play an important part in the present invention. The strain rods 14 may be heated and cooled both externally and internally simultaneously or by either external means or internal means alone.

For external heating, housing 19 is a tubular hollow jacket having a top and bottom which contact the body portion of the strain rod 14. Contained within housing 19 are thermal insulation 23 and a tubular type electrical heating means, the heating elements 20 being represented diagrammatically in FIG. 1B. Cooling is accomplished by passing ambient atmosphere or, preferably, compressed air through the annular passage 24 between the rod 14 and housing 19, by means of a pipe inlet and outlet connections 22, such as air hoses, suitably connected to the annular passage 24 through the top and bottom of the housing 19.

While this would be one external means of heating and cooling strain rods 14, the invention is not so limited as regards external means. For example, to prevent possibly corrosive thermal media from the fluids coming into direct contact with the strain rods, housing 19 may be in the form of a thick-walled tube with pipe inlet and outlet connections passing thereinto at the top and bottom for circulating steam and cold water alternately therethrough.

Alternatively, internal heating means may be provided. Referring now to FIG. 1A, an axial hole or chamber 32 in rod 14 extends nearly the full length of the body portion of rod 14. Tube 31 extends nearly the full length of axial hole 32 and the outside diameter of tube 31 is smaller than the diameter of axial hole 32. Therefore, heating and cooling fluids introduced into axial hole 32 through tube 31 and the tube entrance 30 have an annular passage for flow between the wall of axial hole 32 and the outside wall of tube 31 to chamber exit 33. For particular applications, additional means for expediting the heating and cooling cycles may be used, such as baffling. A conventional spiral baffle (not shown) could be welded to the outside of the tube 31, the outside diameter of the baffle closely fitting against the cylindrical wall of axial hole 32. As is well-known in the art, such a spiral baffle would cause the heating and cooling fluids to follow a much longer path during flow through the annular flow passage between the wall of axial hole 32 and the outside wall of tube 31 than would otherwise be the case; this results in a more efficient and more rapid heating and cooling.

In order to shorten the strain rod heating and cooling cycles still further, the present invention contemplates the insulation of rods 14 from clamping members 12, 13 by all practical means; the ideal condition would be no heat transfer between the rods and the clamping members or mold sections (which are such large energy reservoirs that heating and cooling of the strain rods would be slowed).

Referring now to FIG. 1A, to prevent or reduce heat transfer between rods 14 and the lower clamping member 13, insulation 40 is installed where the lugs 17 of the lower clamping member 13 contact the rods 14 passing therethrough, either as an insulation sleeve on the rod or an insulation lining on the lug. Similar insulation might have been provided between rods 14 and the upper lugs 17, but insulation in these upper locations is not as important as in the lower locations, in this case, because the latter locations are closer to the source of heating and cooling fluids; i.e., the lower locations are in a region of greater temperature extremes and differentials. Also, insulation at the upper locations would undoubtedly soon become damaged in embodiments having strain rods hinged on the lower clamping member after swinging in and out a number of times.

Alternatively, or in addition to the use of insulation in the holes or slots, additional rod insulating effects may be afforded by the use of clamping members of a castellated design (not shown). The clamping member would have hole- or lug-bearing collars (turrets) integral with, but as distant as practicable from, the clamping member to minimize the heat transfer between the clamping member and the strain rods passing through the collars. The collars may be raised or lowered relative to the lug positions shown in FIG. 1 and/or merely considerably extended therefrom horizontally. Furthermore, additional rod insulating effects may be obtained by having grooves 43, like a screw thread, along portions of the inner surface of the lugs 17 (where the lugs 17 would normally contact the rods 14) to reduce the area of contact between the lugs and the rods and thus reduce heat transfer therebetween. Again it might be pointed out that the use of grooves and/or a castellated design is more important for the lower holes or lugs than the upper holes or lugs. If desired, additional insulating material could be placed at each junction of a mold clamping member 12, 13 with a mold section 10, 11—unless, of course, the embodiment being used is the one earlier described having unitary integral mold-press sections the mold sections themselves containing lugs and no separate mold clamping members being used.

The following brief discussion concerns the mechanics involved in the closing and clamping of mold members by the process of this invention. The operation of the thermal pressing and clamping device when closing press or mold members with a deformable third body (i.e., molding compound) therebetween is illustrated in FIG. 3. After a thick heavy charge of molding compound is placed between two platens or mold sections, the strain rods and rod nuts are assembled, and the nuts only manually "wrench tightened"; i.e., the nuts contact the surface of the upper mold, but no thermal cycling has as yet been applied to the strain rods. Referring now to FIG. 3A particularly, heating of the strain rod of original length L to the prescribed temperature causes a thermal expansion DL ($\Delta L$) resulting a gap between the bottom of the nut and the top of the lug. A spacer 21 is then inserted into the gap under each nut. The thickness of the spacer is desirably just sufficient to fill the gap (i.e., the thickness of the spacer(s) equal DL); and it will be assumed for purposes of this discussion that the spacer(s) entirely fill the gap. So far no stress has been produced in the rods.

Referring now to FIG. 3B particularly, subsequent cooling of the heated rod causes a contraction in the length thereof and partial closure of the clamping members or mold sections (assuming that the nut was previously in contact with the spacer). Obviously, it is desirable to design a mold closing and clamping device affording the maximum possible thermal expansion or contraction DL of the strain rods. The thermal expansion or increase DL in the length of the strain rods under heat is accomplished without creating appreciable stresses in the rods as there is no resistance to such expansion. After the insertion of the spacer under the nut and after cooling of the strain rod commences, the strain rod tends to contract to its original length L. If the spacer under the nut prevents this contraction of the rod—say, because the mold is already closed—then (neglecting secondary effects such as compression of the platens or mold members and direct bearing or alignment deflection) the rod will in effect be strained or "stretched" beyond its original length L after cooling by an amount DL, which is the amount of thermal expansion or contraction of the rod.

The amount of effective thermal expansion or contraction of the strain rods is governed by the following factors:

(1) Length L of strain rods (assuming the temperatures reached are uniform throughout the length of the rod), in inches.

(2) Differences between maximum and minimum temperatures reached by the rods during the heating and cooling cycles, respectively; i.e., $(T_{max}-T_0)$, in degrees Fahrenheit.

(3) Thermal coefficient of expansion $a$ ($\alpha$) of the material in the rods (assuming that the rates of expansion and contraction are linear), in inches per inch of length per degree Fahrenheit.

The linear expansion or contraction DL of the strain rod would be:

$$DL = a \times L(T_{max}-T_0)$$

Steel is the material ordinarily employed in applications such as this where a high strength-weight ratio is required. The coefficient of expansion $a$ varies over a range of approximately 30% for various types and alloys of steel. The length of the rods L is selected in general on the basis of design and operating considerations. The allowable temperature range or difference between maximum temperature $T_{max}$ and minimum temperature $T_0$ is generally governed by the maximum temperature $T_{max}$ that may safely be used without damaging the material in the rods. $T_{max}$ therefore depends somewhat upon the particular alloy used and upon the heat treating characteristics thereof. Strain rod temperatures of up to 650° F. can be used without appreciably affecting the molecular structure of carbon and alloy steels. Of course, the strain rods may be composed of any other metal which is molecularly stable at the maximum temperature anticipated.

The unit strain $e$ (the deformation in a material caused by an external force) or elongation in inches per inch of length will be:

$$e = \frac{DL}{L}$$

Hook's law states that, within the proportional limit of the material, stress S is equal to strain $e$ multiplied by the modulus of elasticity E of the material; therefore:

$$S = e \times E = \frac{DL \times E}{L}$$

The total force or load P tending to close or clamp the mold members together at any given moment will be the stress S (i.e. the unit tensile load or stress, in pounds per square inch of strain rod cross section area A) multiplied by the total cross section area $A_T$ of all the strain rods under that stress:

$$P = S \times A_T$$

The above calculations have neglected the effect of the compound upon the stress created during the application of this invention to compression molding. Referring now to FIG. 3B, the compound, being a deformable material, starts to flow immediately after the rods begin to cool after initial contact with the compound. After some short period of time during the cooling process, the original thickness $t_r$ of the charge of molding compound has been compressed to $t_r'$ as a result of the flow of compound between the mold members. After an additional short period of time during the cooling process, the thickness of the compound (i.e., the space separating the mold members) will decrease further to $t_r''$, then to $t_r'''$, etc. FIG. 3B is a representation of the condition occurring momentarily during the cooling of the rods in which the thickness of the compound has just been decreased from its original value of $t_r$ to $t_r'$. This decrease in compound thickness from $t_r$ to $t_r'$ represents an approaching movement of one mold member relative to the other member. The amount of this approaching movement in any given interval of time and for any given thermal pressing and clamping device will depend upon the resistance offered by the compound in its flow within the mold cavity. The harder or more viscous the compound; i.e., the more resistant the compound is to deformation or flow, the greater will be the stresses and strains in the strain rods after the rods are cooled. It is possible, of course, in the case of certain soft and easy-flowing molding compounds that the residual stresses and strains in a set of rods, after cooling, will be small or almost zero, as will be presently discussed.

Unlike the case where the two clamping or mold members are in solid, metal-to-metal contact and the entire thermal contraction of the strain rods is converted into the stresses and strains in the strain rods; where the two clamping or mold members are separated by the molding compound, the yielding or flow of the molding compound prevents the complete conversion of the thermal contraction of the strain rods into stresses and strains. That portion of the thermal contraction DL of the strain rods, upon completion of the cooling phase, which has not become converted into stress S and strain $e$ is represented by and corresponds to the amount of approaching movement that has occurred between one clamping member or mold section relative to the other; namely $(t_r - t_r')$. This approaching movement may be considered as "lost motion" insofar as conversion of thermal contraction to strain is concerned.

The portion of the thermal contraction of the strain rods that *does* become converted into stress S and strain $e$, therefore, will be the difference between the total thermal contraction DL and the above-mentioned approaching movement $(t_r - t_r')$; i.e., the difference is the portion of the thermal contraction represented by $DL - (t_r - t_r')$. Thus the formula for the residual clamping stress of viscous solid charges is not the simplified formula shown above $$\left( S = \frac{DL \times E}{L} \right)$$

but:

$$S = \frac{DL - (t_r - t_r')}{L} \times E$$

Accordingly, the residual clamping load P (i.e., the clamping load remaining after deformation of the compound) exerted by this set of rods on the mold members upon completion of the cooling phase will be:

$$P = S \times A_T = \frac{DL - (t_r - t_r')}{L} \times E \times A_T$$

In the case of a very soft, easy-flowing compound, the change in height of the molding compound charge $(t_r - t_r')$ becomes equal to or approaches the thermal contraction of the strain rods DL, so that the residual stress S and, hence, the residual clamping load P becomes equal to or approaches zero.

The above description concerning the approaching movement of the mold members and the stresses and strains in the rods applies not only to the condition after the rods have been completely cooled, but also to the corresponding conditions that exist at various instants during the cooling cycle. For the various instantaneous conditions existing during the cooling cycle, it must be realized that the already-occurred thermal expansion or contraction DL of the rods must be taken as the thermal expansion or contraction DL', corresponding to the applicable temperatures; i.e., the difference in the rod lengths at the temperature $T_{max}$ to which the rods were fully heated and at the temperature T' which exists in the rods at that given instant during the cooling phase which is under consideration; therefore the instantaneous residual clamping load P' is:

$$P' = \frac{a \times L \times (T_{max} - T') - (t_r - t_r')}{L} \times E \times A_T$$

As the mold members approach the fully closed condition, the resistance to further flow of the molding compound in the mold cavity generally increases rapidly because of the narrowing space through which flow can take place; i.e., such space as remains between the mold cavity sections and/or cavity lands. Therefore, after the residual thickness $t_r'$ of the compound in these critical passages become small, the following cooling cycle on a set of strain rods will decrease this space very little, if any. As $(t_r - t_r')$ becomes infinitesimal, the instantaneous stress $S'$ and the instantaneous residual clamping pressure load $P'$ becomes essentially that previously presented for the case of mold members in solid, metal-to-metal contact. Thus, after the mold has been closed and the mold members are essentially in metal-to-metal contact (with perhaps only a thin layer of compound between the solid mold cavity lands), one additional cooling cycle of one or more sets of rods will serve to maintain the necessary clamping load on the mold cavity lands during cure.

It will be realized that if all rods in the mold closing and clamping device are heated and cooled together in unison—i.e., if the rods are operated in only one set—the stresses in the rods and the clamping force on the mold drop to zero during the heating process (regardless of the flow characteristics of the molding compound). This does not occur when the strain rods are operated in sets. While the set of strain rods which has completed the cooling phase is being again heated, the other set is in the coling phase and therefore exerting a clamping force on the mold (except in the case of a very soft, easy-flowing compound—in which case, as previously explained, $(t_r - t_r')$ becomes equal to DL during the cooling of one set of rods so that the clamping load P drops to zero).

Furthermore, by operating the rods in two sets, one set of rods can be heated while the other set of rods is cooling, thereby eliminating at least a large portion of the idle waiting time involved when the rods are operated thermally in only one set. Ordinarily several such heating and cooling cycles or approaching movement are required before the mold members are fully closed or essentially in solid contact. The time required to heat a set of rods is generally longer than is the time required to cool them, and therefore the heating phase of a thermal cycle may be commenced on one set of rods before complete termination of the cooling phase of another set of rods. Also, where design considerations permit and where the permissible range of mold clamping pressures during mold closures is small, the rods may be operated in three or more sets. This would not only maintain a steadier and higher clamping force on the mold members at all times during closure of the mold, but also expedite the closing operation and the production cycle.

Of course, many modifications of this apparatus and process may now become apparent to those skilled in the art. Consequently, the spirit and scope of this invention should not be considered as defined by the foregoing disclosure, but by the appended claims.

Having thus described our invention, what we claim and desire to protect by Letters Patent is:

1. A pressing process comprising the steps of (1) heating in unison a first plurality of thermally responsive strain devices connecting a pair of pressing elements to elongate the devices, (2) taking up the gaps formed between a pressing element and the head portions of the devices of the first plurality in step (1), (3) cooling in unison the devices of the first plurality to reduce the elongation and press the pair of pressing elements towards each other, (4) heating in unison a second plurality of thermally responsive strain devices connecting the pair of pressing elements to elongate the devices, (5) taking up the gaps formed between a pressing element and the head portions of the devices of the second plurality in steps (3) and (4), (6) cooling in unison the devices of the second plurality to reduce the elongation and further press the pair of pressing elements towards each other.

2. The pressing process of claim 1 wherein the heating of the devices of the second plurality in step (4) commences prior to the termination of the cooling of the devices of the first plurality in step (3).

3. The pressing process of claim 1 wherein the gaps are taken up in steps (2) and (5) by inserting gap filling means between a pressing element and the head portions of the devices of the last heated plurality.

4. The pressing process of claim 1 wherein each of the pluralities of devices is symmetrically located about a molding cavity so as to cause the exertion of pressure by the pair of pressing elements in a symmetrical manner about the molding cavity.

5. The pressing process of claim 1 have the additional steps of (7) heating in unison a third plurality of thermally responsive strain devices connecting the pair of pressing elements to elongate the devices, (8) taking up the gaps formed between a pressing element and the head portions of the devices of the third plurality in steps (3), (6) and (7) and (9) cooling in unison the devices of the third plurality to reduce the elongation and further press the pair of pressing elements towards each other.

6. The pressing process of claim 1 wherein molding compound is introduced into an open mold cavity between the pair of pressing elements before the mold cavity is closed.

7. The pressing process of claim 1 wherein molding compound is introduced into a mold cavity between the pair of pressing elements after the mold cavity is closed.

8. The pressing process of claim 1 wherein a mold cavity is defined by the pair of pressing elements.

9. The pressing process of claim 1 wherein a mold is inserted between the pair of pressing elements.

10. A pressing and clamping process comprising the steps of (1) connecting a first pressing element to a second pressing element by a plurality of sets of elongated thermally responsive strain devices, each of said devices being connected to said first pressing element and freely passing away from said first pressing element through said second pressing element; (2) alternately heating and cooling each of said sets successively to cause responsive thermal axis elongation and contraction of the devices of successive sets; and (3) during step (2) taking up the gaps formed by step (2) between said second pressing element and the end portions of the devices of the hot set by the elongation of the devices of that set and the contraction of the devices of the cooler set, whereby cooling of the devices of said hot set causes approach of said pressing elements towards one another; the heating and cooling cycles of the various sets being successively timed to provide a continuous exertion of restraining pressure by cool devices, thereby preventing retreat of said pressing elements from one another during the heating of other devices.

11. A pressing apparatus comprising at least two pressing elements adapted to exert closing pressure, a plurality of sets of elongated thermally responsive strain devices, means for each set for heating the devics therof in unison, means adapted to control the heating means to heat the devices of a successive set after the devices of a preceding set have commenced cooling, and means to take up the gaps caused between head portions of the devices of a particular set and a pressing element by the thermal axial elongation of the devices of that particular set the thermal axial contraction of the devices of another set; whereby there is a continuous exertion of restraining pressure by cool devices to prevent retreat of the pressing elements from one another during heating of other devices.

12. The pressing apparatus of claim 11 including means defining a mold cavity between said pressing elements.

13. The pressing apparatus of claim 12 having means for cooling the devices of each single one of said sets in unison after heating thereof.

14. The pressing apparatus of claim 13 in which said cooling means are jackets about said devices with passages through which circualtes a cooling medium.

15. The pressing apparatus of claim 13 in which said heating means and said cooling means are fluids in direct contact with said devices.

16. The pressing apparatus of claim 12 in which said heating means are jackets containing heating elements about said devices.

17. The pressing apparatus of claim 12 in which said means defining a mold cavity are surfaces of said pressing elements.

18. The pressing machine of claim 12 in which said pressing elements are adapted to receive therebetween said means defining a mold cavity.

19. The pressing apparatus of claim 12 in which said means defining a mold cavity define a completely closed mold cavity.

20. The pressing apparatus of claim 12 in which said means defining a mold cavity define a closed mold cavity communicating only with means for introducing molding compound thereto.

21. The pressing apparatus of claim 12 in which each of said pressing elements have peripherally extending lugs defining slots, said slots being adapted to receive the ends of said devices, said lugs being adapted to receive pressure from the head portions of said devices.

22. The pressing apparatus of claim 12 in which said pressing elements have peripherally extending lugs and said gap taking up means for each of said devices comprises at least one insert adapted to surround a portion of the circumference of said device between the head portion thereof and one of said lugs.

23. The pressing apparatus of claim 12 in which said devices are solid.

24. The pressing apparatus of claim 12 in which said devices are partially hollow.

25. The pressing apparatus of claim 24 in which said devices contain paths for the circulation of a thermal-transfer medium.

26. The pressing apparatus of claim 12 in which said devices of each of said sets are similarly spaced about said means defining a mold cavity so that each of said sets exerts a similarly distributed force on all sides of said pressing elements.

27. The pressing apparatus of claim 26 in which said devices of each of said sets are symmetrically located about said means defining a mold cavity.

References Cited by the Examiner

UNITED STATES PATENTS 2,585,818   2/1952   Moravec.
2,990,583   7/1961   Barbera _____ 264—319

ROBERT F. WHITE, *Primary Examiner.*

R. B. MOFFITT, *Assistant Examiner.*